United States Patent [19]
Souissi et al.

[11] Patent Number: 5,878,352
[45] Date of Patent: Mar. 2, 1999

[54] APPARATUS AND METHOD FOR SELECTING A TRANSMITTER FOR DIRECTED MESSAGE DELIVERY

[75] Inventors: Slim Souissi, Fort Worth, Tex.; Samir A. Sawaya, San Diego, Calif.; Alain Charles Louis Briancon, McKinney; Gregory Lewis Cannon, Keller, both of Tex.

[73] Assignee: Motorola, Inc., Schaumburg, Ill.

[21] Appl. No.: 770,306

[22] Filed: Dec. 20, 1996

[51] Int. Cl.⁶ .............................. H04B 1/10; H04M 1/00
[52] U.S. Cl. ..................... 455/503; 455/436; 455/437; 455/445; 455/11.1; 455/63; 455/67.1; 455/226.3; 455/575; 370/313; 370/332
[58] Field of Search .................... 455/503, 11.1, 455/67.1, 436–439, 442, 445, 447, 452, 9, 517, 519, 575, 63, 67.3, 134, 135, 226.2, 226.3; 370/342, 312, 313, 332

[56] References Cited

U.S. PATENT DOCUMENTS

| | | | |
|---|---|---|---|
| 5,285,447 | 2/1994 | Hulsebosch | 455/33.2 |
| 5,423,063 | 6/1995 | Goldberg | 455/33.1 |
| 5,493,563 | 2/1996 | Rozanski | 455/33.2 |
| 5,517,675 | 5/1996 | O'Connor | 455/33.2 |
| 5,590,403 | 12/1996 | Cameron | 455/33.4 |

*Primary Examiner*—Donnie L. Crosland
*Attorney, Agent, or Firm*—Charles W. Bethards

[57] ABSTRACT

A method and the corresponding messaging system of selecting a transmitter for directed message delivery set is a messaging system including a plurality of transmitters arranged and constructed to operate in a simulcast or non-simulcast mode, the method including directing a first and a second transmitter to transmit in the simulcast mode, respectively, a first signal including a reference parameter and a first identification signal and a second signal including the reference parameter and a second identification signal, the first identification signal and the second identification signal distinguished from the reference parameter by, respectively, a first and a second predetermined amount, and receiving an acknowledgment signal that includes a indication of the first identification signal relative to the second identification signal or both relative to a threshold as determined at a messaging unit location, the indication corresponding to a preferred transmitter, selected from the first and the second transmitter, for a directed message delivery to the messaging unit.

28 Claims, 5 Drawing Sheets

APPARATUS AND METHOD FOR SELECTING A TRANSMITTER FOR DIRECTED MESSAGE DELIVERY

FIELD OF THE INVENTION

The present disclosure concerns methods of selecting a desirable transmitter for message delivery and more particularly but not limited to such methods set in a messaging system arranged to operate in a simulcast mode but using directed message delivery.

BACKGROUND OF THE INVENTION

Messaging Systems are known. Such systems routinely use a simulcast transmission mode for message delivery. This simulcast mode denotes a situation where all transmitters within a geographic area are active at the same time on the same radio frequency. To facilitate, indeed enable, successful communications in a simulcast mode, extreme care must be taken to insure that modulation on radio signals that originate from different transmitters and arrive at a location where the signal strength of each signal is equal are phase coherent or in phase. Equal is taken to mean within or approximating the capture ratio of a typical messaging unit or within about 6 dB for many messaging receivers when using frequency modulation.

Simulcast operation has proven to be very effective at reaching messaging receivers that are located at some unknown location within a large geographic area. However messaging systems that rely entirely on simulcast operation may be unduly capacity limited since the radio frequency used by the system can not be used at the same time for any purpose other than delivery or transmission of a single message anywhere in the system. Practitioners have realized that knowledge of a messaging unit location would allow a portion of the system, such as one transmitter, to transmit the message to the intended messaging unit. Concurrently other portions of the system, such as other transmitters may be used for other noninterfering duties, such as delivery of other messages to other messaging units, thus better utilizing system capacity.

In recognition of this some systems use digital identification (ID) signals that are unique to each transmitter providing coverage within a region. These digital identification signals or digital color codes are simulcast from each transmitter and a messaging unit with an address matching a simulcast transmitted message reports back to the system the digital ID it has received. The system thereafter attempts further or additional contemporaneous message delivery to this unit utilizing only the transmitter with that digital ID. This latter mode of operation is often designated directed or directed delivery or non-simulcast operation. While the use of digital color codes can provide a significant degree of directed message delivery and thus significant reuse of the system frequency by other transmitters within the system, certain drawbacks or limitations remain.

For example, if two signals are received each having approximately equal magnitude, the digital color codes will interfere with each other and neither may be accurately recovered. In this instance the messaging unit may not be able to determine which transmitter(s) are providing coverage. In any event, when a single digital ID is recovered it will represent the transmitter providing the best or strongest signal at the location of the messaging unit. Weaker signals with their respective digital IDs will be lost even when the weaker signal nevertheless has a completely adequate signal level. In this instance a potential opportunity or contemporaneous directed message delivery to two messaging units may be lost with a resultant reduction in system utilization. Clearly a need exists for methods and apparatus for selecting a suitable transmitter for directed message delivery in present day messaging systems.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
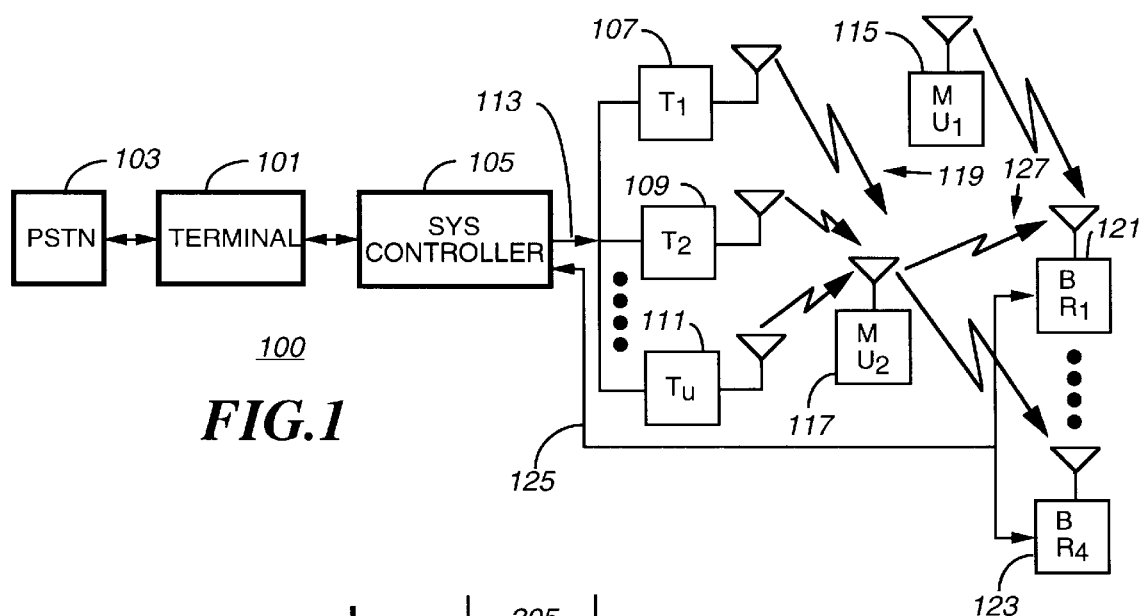
FIG. 1 depicts in exemplary form, a messaging system in accordance with a preferred embodiment of the present invention.

The present disclosure concerns messaging systems and selective messaging systems and messaging units for such systems together with methods within such systems all directed to an improved and inventive approach to determining or selecting a suitable transmitter for directed message delivery to a subscriber messaging unit. A preferred method of selecting a transmitter for directed message delivery in a messaging system arranged and constructed to operate in a simulcast mode and the corresponding messaging system are discussed. The method includes; directing a first and a second transmitter to transmit in a simulcast mode, respectively, a first signal including a reference parameter and a first identification signal and a second signal including the reference parameter and a second identification signal, where the first identification signal and the second identification signal are distinguished from the reference signal by, respectively, a first and a second predetermined amount, and receiving an acknowledgment signal that includes a strength indication of the first identification signal relative to the second identification signal as determined at a messaging unit location, the strength indication corresponding to the preferred transmitter selected from the first and the second transmitter for a message delivery to the messaging unit in a non-simulcast mode.

Having determined the preferred transmitter, further transmissions of messages to that messaging unit may be made from this transmitter in a non-simulcast mode. The preferred form of the reference parameter or reference signal and identification signals includes a reference tone and a plurality of identification (ID) tones where each such ID tone is uniquely assigned to a transmitter such that no two transmitters within communication range of a given messaging unit will have the same identification tone. The reference parameter or reference signal may alternatively be any signal attribute including only the carrier frequency in relatively high frequency stability systems, provided some characteristic of the reference signal is known, similar for all transmitters, and not subject to non-linear effects such as the capture effect encountered in phase modulated communications systems. The identification signals, while preferably tones, may be any orthogonal signal including for example a windowed tone.

Various forms of the strength indication are contemplated with each having certain utility. The first form compares all identification tones received at a messaging unit to a threshold and reports all or a plurality of those that are satisfactory while another merely reports the strongest or best tone as determined, preferably, by a weighted average over a plurality of transmissions and as a subset at least implicitly reports when none of the received transmitter ID tones are satisfactory. In the last case it may be assumed that further messages should be delayed or alternatively transmitted in a simulcast mode for a messaging unit reporting this circumstance.

An alternative preferred method of determining a desirable transmitter for a message delivery to a messaging unit and the corresponding messaging unit or selective messaging unit are also discussed. The method includes receiving a simulcast signal including a reference parameter or signal, a first identification signal, and a second identification signal, where the first identification signal and the second identification signal are distinguished, preferably spectrally spaced, from the reference signal by, respectively, a first and a second predetermined amount that corresponds, respectively, to a first transmitter and a second transmitter, comparing the first identification signal and the second identification signal to provide a strength indication, and transmitting a signal including a transmitter identification corresponding to this strength indication. For this method corresponding preferred forms of the reference and identification signals are used with corresponding results as further discussed below.

A preferred messaging system in accordance with the present invention includes a plurality of transmitters arranged and constructed to operate in a simulcast mode or non-simulcast, reuse, mode. The system includes; a first transmitter for transmitting in a simulcast mode a first signal including a reference parameter or signal and a first identification signal distinguished or spectrally spaced from the reference signal by a first predetermined amount, a second transmitter for transmitting in a simulcast mode a second signal including the reference signal and a second identification signal spectrally spaced from the reference signal by a second predetermined amount, a base receiver for receiving an acknowledgment signal that includes a strength indication corresponding to a comparison of the first identification signal and the second identification signal as determined at a messaging unit location, where the strength indication corresponds to the preferred transmitter selected from the first and the second transmitter for a message delivery to the messaging unit in a non-simulcast mode. The system preferably additionally includes a controller coupled to all transmitters and base stations for controlling the system and scheduling or directing transmissions in simulcast or non-simulcast modes. Similar preferred forms of the reference and identification signals are used and directed to similar results.

For a clearer understanding of the present disclosure the reader is referred to the FIG. 1 depiction of a representative messaging system (100), preferably, selective messaging system. The messaging system includes a gateway or terminal (101) coupled to a message source such as the public switched telephone network (103). The terminal is available from Motorola as the WMG™ product as well as other manufacturers. The terminal is coupled to, often collocated with, a system controller (105), such as a Motorola RFC™ or CONDUCTOR. The terminal and system controller operate together to communicate messages with destination addresses to the system controller or various responses back to the terminal, thus PSTN and originator.

The messaging system includes a plurality of transmitters with three depicted as a first, second and nth transmitter (107, 109, . . . 111). The transmitters are available as Motorola NUCLEUS II™ transmitters and are coupled to the system controller by an outbound network channel (113). The outbound network channel is preferably leased telephone lines but may be any suitable media operating with any suitable networking or communication protocol including a radio link. The system, specifically controller and transmitters are arranged and constructed to operate in either a simulcast or non-simulcast mode. Operating in a simulcast mode as is generally known implies that the modulation on all carriers originating at all transmitter is substantially phase coherent and this is accomplished by insuring that all transmitters transmit the same message at the same time. Non-simulcast operation is operation of one or more transmitters in an independent fashion thus potentially increasing system capacity by virtue of the transmitter reuse. The particular equipment, such as a satellite or GPS based system typically used to provide the timing information with the degree of accuracy associated with or required for simulcast operation is, generally known, not further relevant nor further discussed, and not specifically shown.

Generally the system controller provides control of the system, including scheduling messages intended for messaging units that are registered on or subscribe to the system's services, such as two depicted messaging units (115, 117). These messages are forwarded to the transmitters for subsequent transmission in accordance with a system protocol at a particular time on the forward or outbound radio channel (119). Additionally, the messaging system includes a plurality of base receivers, such as two depicted base receivers (121, 123) coupled by an inbound or network channel (125) to the system controller. Messages originating at the messaging units, either volitionally or responsive to a received message, are coupled by the reverse or inbound radio channel (127) to one or more of the base receivers where they are forwarded or relayed to the system controller on the inbound or network channel. The system controller may use these inbound messages for scheduling decisions or may forward them to the terminal, if, for example, they are intended for a user destination.

Figure 2:
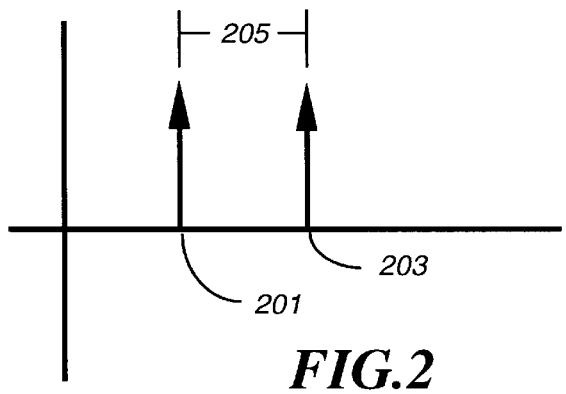
FIG. 2 shows a spectrum plot of one exemplary identification signal.
Figure 3:
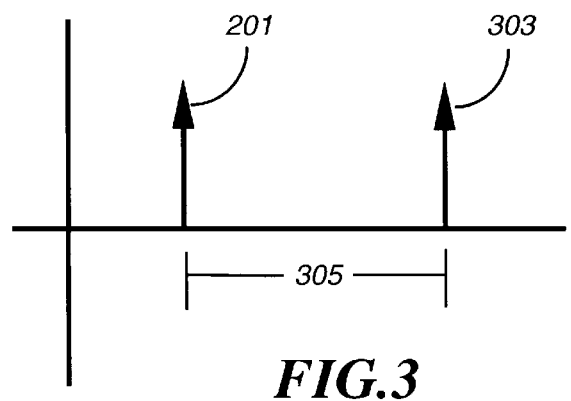
FIG. 3 shows a spectrum plot of a second exemplary identification signal.

More specifically the messaging system in operation includes the first transmitter (107) transmitting in a simulcast mode a first signal, preferably an FM modulated radio signal on the forward channel (119). Referring to the FIG. 2 spectrum plot, the first signal includes or is modulated by a reference signal (201), preferably a reference tone of 1000 Hz, and a first identification signal, preferably a unique first transmitter identification tone of 1200 Hz, spectrally spaced from said reference signal by a first predetermined amount, preferably 200 Hz. Similarly included is the second transmitter (109) transmitting in a simulcast mode a second, preferably FM modulated radio signal on the forward channel. Referring to the FIG. 3 spectrum plot, the second signal includes or is modulated by the reference signal (201) and a second identification signal, preferably a second transmitter identification tone of 1400 Hz spectrally spaced from the reference signal by a second predetermined amount, preferably 400 Hz. Generalizing, many more base stations can be simulcasting their respective signals with their respective identification tones and a common reference parameter, here tone and yet each transmitter can be distinguished from the others by a receiver in a common coverage area that is operating in accordance with the inventive principles discussed here. As many as 30 different identification tones have been contemplated each separated from all others by, preferably, 200 Hz.

Generally speaking in a practical messaging system the plurality of transmitters all transmit in a simulcast mode with each transmitter having a unique identification signal, preferably unique transmitter identification tone and a common reference parameter or reference signal, preferably reference tone. The system controller is responsible for assigning the unique identification signal to each base station within a cluster or grouping of base stations with same identification signals reassigned only within a different cluster using well known principles of reuse from spatial diversity systems such as cellular systems. The preferred system is a scheduled messaging system, such as a Motorola ReFLEX™ or inFLEXion™ system modified in accordance with the inventive principles disclosed herein. This system has a frame and time slot organized forward radio channel, such as depicted in FIG. 5.

Figure 5:
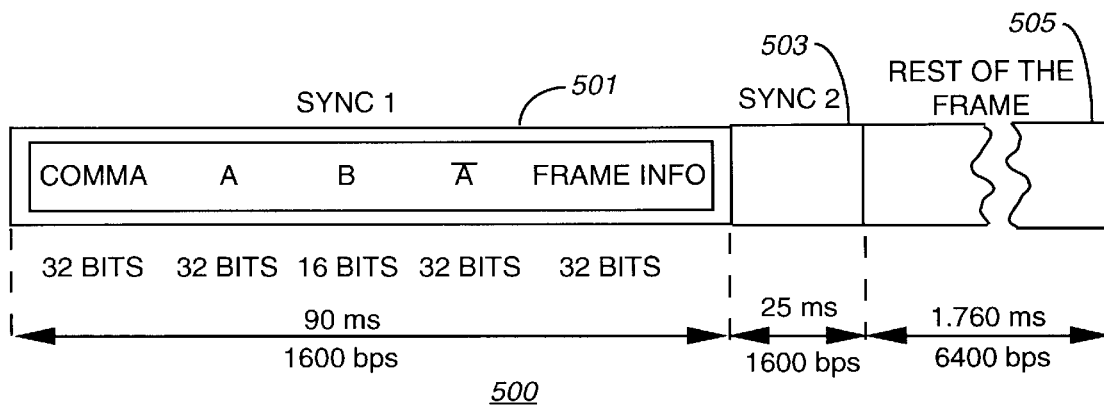
FIG. 5 shows a partial forward channel frame structure suitable for use in the FIG. 1 messaging system.

FIG. 5 shows a preferred frame structure (500) that is transmitted in a simulcast mode from time to time, such as whenever the system has messages to be delivered and needs to know where the destination messaging units are located. The frame structure includes a first Sync portion (501), a second Sync portion (503), and the rest of the frame (505). The Sync portions provide sufficient information to allow for frame, word, and bit synchronization of the relevant messaging units to the forward radio channel together with other protocol dependent overhead information, such as zone identifiers, frame numbers, cycle numbers, and the like, that may be necessary for operation within the system however is not here further relevant. The rest of the frame includes messaging unit addresses and scheduling information for each messaging unit on the forward and reverse radio channel.

The first Sync portion is 90 milliseconds (ms) long and is transmitted, preferably at 1600 Bps. This portion includes an identification or color code portion (507) that is 10 ms or the equivalent of 16 bits in duration. From testing the duration has been successfully varied from 5 ms to as much as 40 ms and may be included at any predetermined location within the frame structure The above mentioned identification signals, specifically a unique, within a given area or cluster of base stations, such signal for each base station are, preferably, simulcast transmitted during the portion (507).

Figure 4:
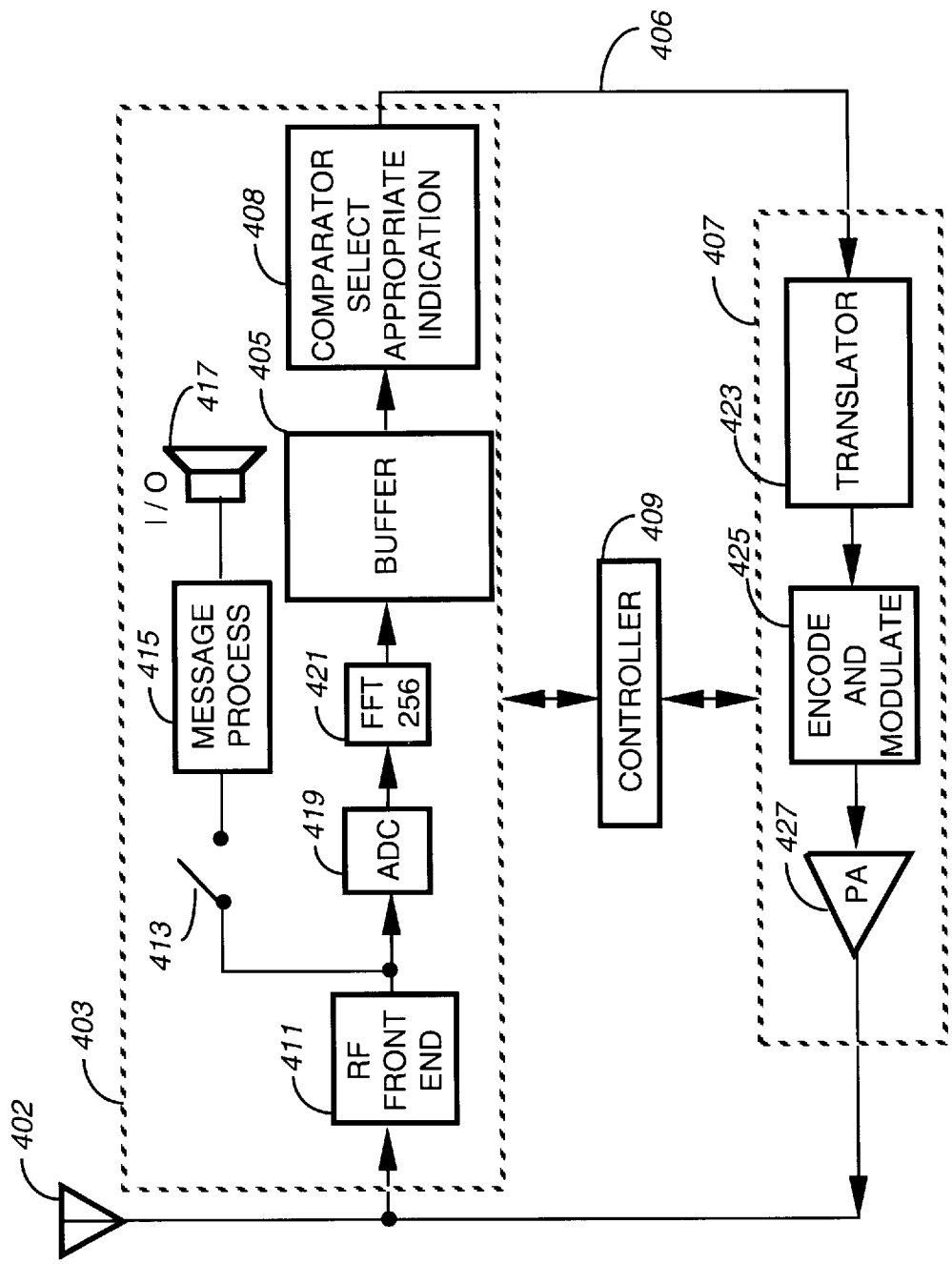
FIG. 4 depicts a preferred block diagram of a messaging unit suitable for use in the FIG. 1 system in accordance with the present invention.

The above simulcast signals will likely be received as a simulcast signal by a messaging unit (MU), such as messaging unit (117). Referring to the FIG. 4 block diagram, this MU is digital signal processor (DSP) based and arranged and constructed to determine a desirable transmitter for a message delivery and includes; a receiver (403) for receiving the simulcast signal including the reference signal (201) as detected after constructive addition, the first identification signal (203) as detected with path loss, and the second identification signal (303) as detected with path loss where all distinctions, such as spectral spacings between the reference parameter and identification signals preserved.

The MU also includes, here depicted as part of and coupled to the receiver (403) a buffer (405) and comparator (408) operating cooperatively to compare signal strengths or qualities, preferably the first identification signal and the second identification signal to provide an indication or strength indication signal at output (406). The comparator selects the appropriate indication signal, corresponding to an associated transmitter identification, and provides the indication signal to a MU transmitter (407). MU transmitter (407) transmits a signal including this indication or strength indication signal and thus transmitter identification on the reverse radio channel. In summary the system controller (105) then directs further messages destined for and thus received by this MU from a transmitter corresponding to the indication or transmitter identification in a non-simulcast mode.

The receiver (403) is largely DSP based and is coupled to and controlled by a controller (409) that is based on a Motorola 68300 or similar series microprocessor. The controller (409) is executing software routines that are known or readily developed by one of ordinary skill given the inventive principles discussed here and takes care of radio management such as proper operational functions, timing, synthesizer frequency settings, and the like as generally well known. The receiver does include an RF frontend (411) coupled to an antenna (402) that operates to filter, amplify, and select given frequency carrier signals, and demodulate the carrier to provide a base band signal all as well known. When a message is received that is destined for user consumption, visual or aural, a switch (413) routes the message to a message processor (415) and to user I/O (417). Additionally all messages received are coupled in a baseband format to a well known analog to digital converter (419) where they are sampled at the rate of 51.2 thousand 8 bit samples per second.

These samples or words are then processed in accordance with a 128 point or alternatively 256 point fast Fourier transform (FFT) function (421) as is well known. Preferably the received simulcast signal includes a reference tone version of the reference parameter or signal and a first and a second transmitter identification tone version of the first and second identification signals. If so, referring to FIG. 6 the results (600) of this FFT are buffered or stored by buffer (405). These results, preferably, include amplitude peaks (601) and the corresponding locations (603), for example the first, second, etc. identification signal spectral location, designated, $f_1$–$f_{12}$, of the identification signals or tones relative to the spectral location (605) of the reference parameter (606) or reference tone. In the preferred form, at each operation of the FFT function the results are coupled to the buffer (405) where, preferably, a running or rolling weighted average or sum of the last plurality, for example eight, operations is maintained or stored. A simpler though likely less reliable approach is to store only the latest results.

The weighting allows for giving the more recent results or measurements greater effect while the plurality of measurements accounts for various anomalies of radio channels, such as fading. A simple linear weighting curve where the most recent measurement is given twice the weight of the oldest measurement with intermediate values receiving linearly related intermediate weights has been modeled with satisfactory results. More complex weighting curves, such as exponential or geometric, may be employed to more carefully mold the effects of newer and older measurements. As noted or implied earlier the comparator provides an indication or strength indication signal by scanning and comparing all received amplitude peaks or weighted sums thereof and selecting an appropriate or acceptable, preferably the best or strongest, one of these peaks or sums. As an alternative to the strongest peak being reported, all acceptable peaks or sums or indications may be reported.

Figure 6:
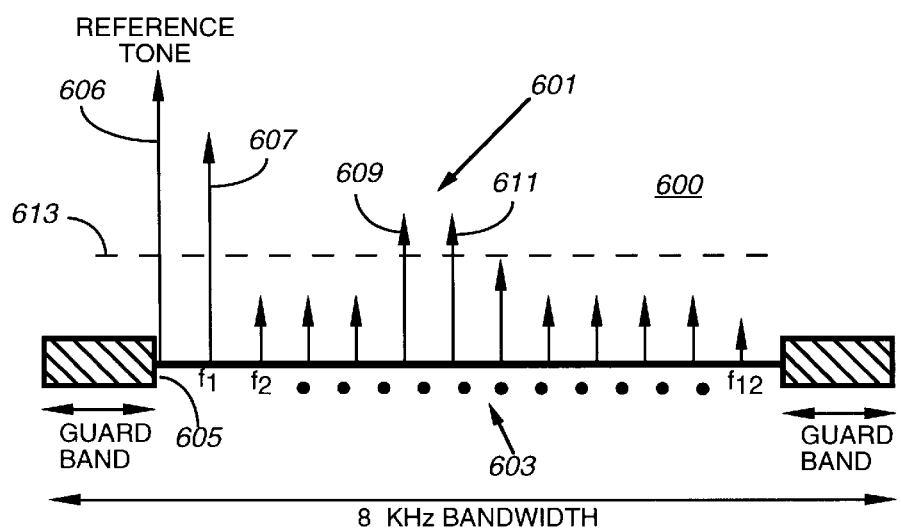
FIG. 6 depicts an exemplary received spectrum as detected at the FIG. 4 messaging unit suitable for use in the FIG. 1 system.

By way of example and assuming the simple case of a single result from the FFT function, FIG. 6 by observation indicates that the strongest identification signal, here tone, is $f_1$ (607) with $f_5$ (609) and $f_6$ (611) being close seconds. Presuming a one to one correspondence, transmitter 1 (107) would appear to be the strongest, thus preferred transmitter. Alternative embodiments or comparisons would compare all received identification tones to a threshold (613) and then provide a strength indication signal that corresponds to all acceptable identification tones, here by observation (607, 609, 611) implying that corresponding transmitter 1, transmitter 5, or transmitter 6 would be acceptable. Note however that if the system controller attempts a directed message delivery to the MU, reporting this status, using either transmitter 5 or 6 and simultaneously attempts a message delivery to another MU using the other transmitter it is likely that the message delivery to the reporting MU will be unsuccessful since both transmitter 5 and 6 are apparently being received at the same level by the reporting MU. As a further alternative if the comparison of all received identification tones to the threshold showed that no identification tones were acceptable the MU may still report with an indication of that status. The system controller will know, implicitly, that communications is possible in a simulcast mode but not in a directed message mode.

More generally the MU transmitter (407) includes a translator (423) coupled to the indication at output (406) that incorporates this indication into an outbound transmit bit stream or information as generally known. This outbound bit stream may represent an acknowledgment message when the MU has been addressed by the system or may simply be a volitionally generated message. The translator is coupled to an encoder and modulator (425) that modulates as generally known the MU transmitter carrier with an encoded signal to provide a modulated carrier that is then amplified as known by power amplifier (427) and coupled to antenna (402). In this manner the MU, specifically MU transmitter transmits a signal that includes a transmitter identification corresponding to a strongest or best identification tone thus base or infrastructure transmitter, a plurality of acceptable identification tones thus such transmitters, or possibly no acceptable identification tones thus no acceptable transmitters as determined by a comparison of all identification signals including the first and the second transmitter identification tone to each other or to a predetermined threshold. When no acceptable identification tones have been observed the MU receiver may receive further transmissions, in a simulcast mode, using for example the first and the second transmitter.

These transmissions from the MUs will ordinarily be received by one or more of the base receivers (121, 123). Thus a base receiver will receive an acknowledgment signal that includes an indication corresponding to a comparison of all identification signals received at an MU including the first identification signal and the second identification signal as determined at the MU location and this indication will correspond to a preferred transmitter, selected from the first and the second transmitter, for a directed message delivery to said messaging unit. The base receiver forwards the indication to the system controller and further contemporaneous transmissions to this MU are directed by the controller to be undertaken by the preferred transmitter in a non-simulcast or directed delivery mode.

When the message or acknowledge message includes an indication corresponding to a strongest identification tone the corresponding transmitter will be used for the directed message delivery attempts. When the indication corresponds to a plurality of acceptable identification tones as determined by a comparison of said first and said second transmitter identification tone to a predetermined threshold at the messaging unit the system controller may select any one of the acceptable transmitters for subsequent directed messages. The particular selection in this case will likely depend on other system traffic considerations. If the indication corresponds to no acceptable identification tones the system controller will need to delay directed delivery messages for this MU or use simulcast attempts for further contemporaneous message delivery attempts for this particular MU.

Figure 7:
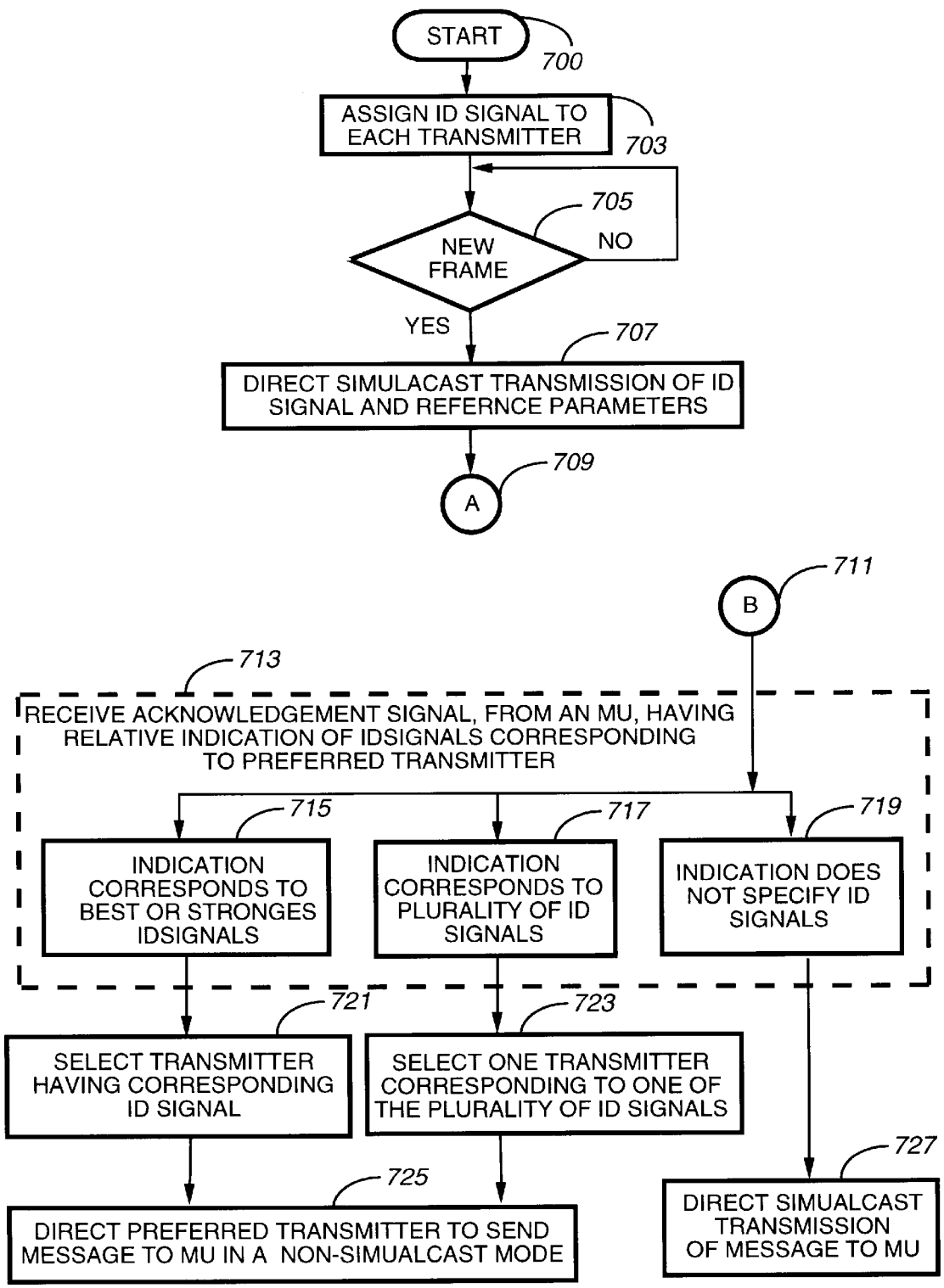
FIG. 7 depicts a flowchart of a preferred method of operation from the perspective of the FIG. 1 system.

Referring to FIG. 7, a more detailed explanation of a method embodiment of the present invention will be provided. The setting is a messaging system including a plurality of transmitters arranged and constructed to operate in a simulcast mode such as the system discussed with reference to FIG. 1. The method is directed to selecting one of this plurality of transmitters for a directed or non-simulcast message delivery to an MU such as the MU discussed with reference to FIG. 4. The method begins at 700. Step (703) indicates that an identification (ID) signal is assigned to each transmitter. This ID signal is preferably a tone as earlier discussed and will be unique to each base station within a given geometrically proximate region. Approaches for providing such unique assignments are generally known from for example a similar problem with carrier frequencies in the cell phone industry. Generally the assignment is handled by the system operator using the system controller so as to facilitate any future system updates or modifications.

Thereafter step (705) determines whether a new frame is starting or scheduled. The "new frame" may be any predetermined time period or event that occurs with some relative regularity. In any event if the new frame or other event is scheduled, step (707) directs a simulcast transmission of respective identification signals, preferably unique identification tones as modulation on a radio frequency carrier, including a reference parameter, preferably reference tone as modulation, from each of the transmitters. Preferably a system controller directs at least a first and a second transmitter to transmit in the simulcast mode, respectively, a first signal including a reference parameter and a first identification signal and a second signal including the reference parameter and a second identification signal, where the first identification signal and the second identification signal are distinguished from the reference parameter by, respectively, a first and a second predetermined amount. After step (707), the process moves to and returns from FIG. 8 at, respectively, A (709) and B (711) where preferably an MU detects and responds to the simulcast signals, as further discussed below.

After B (711) step (713) receives an acknowledgment signal or other volitionally generated signal, preferably from an MU, having a relative indication of ID signals corresponding to a preferred transmitter. Preferably this signal at least includes an indication of the first identification signal relative to the second identification signal as determined at a messaging unit location where the indication corresponds to a preferred transmitter, selected from the first and the second transmitter, for a directed or non-simulcast message delivery to this messaging unit. This receiving step is preferably performed at a base receiver with the information received then being forwarded to and received by the system controller.

More specifically step (713) includes steps (715, 717, 719) each denoting different methodology depending on the particulars of the indication received. Step (715) is followed when the indication corresponds to the best or strongest ID signal determined at the MU location by a comparison of all received ID signals and is followed by step (721) where the transmitter having the corresponding ID signal is selected, preferably by the system controller. Note the indication from the MU may include or specify the preferred transmitter however allowing the system controller to do the correlation will usually provide greater future system flexibility. Then step (725) directs this preferred transmitter to send any further contemporaneousor directed delivery mod non-simulcast or directed delivery mode.

If the indication corresponds to a plurality of acceptable ID signals as determined at the MU by comparing all received ID tones to a threshold thus suggesting a plurality of acceptable transmitters for further directed message delivery attempts, step (717) is followed after which step (723) is directed to selecting one transmitter corresponding to one of the plurality of ID signals. Step (723) will be performed, preferably, by the system controller with the eventual selection depending, for example, on other system traffic requirements. After step (723) step (725) is performed. When the indication does not specify an ID signal thus indicating that no ID signal is acceptable when compared to a threshold, step (719) is followed and step (727) is then performed. Step (727) directs further contemporaneous transmissions to this MU in a simulcast mode. The method of FIG. 7, while set in a messaging system, is preferably executed at the system controller and is implemented with software routines readily modified or written by one of ordinary skill given the inventive principles discussed here FIG. 8 starts at A (709) and depicts a method for determining a desirable transmitter for a message delivery to a messaging unit. This method is preferably practiced at an MU principally with readily available or readily modified software routines written in accordance with the principles discussed here so as to execute on the MU's controller or DSP. Step (801) receives a simulcast signal, preferably as transmitted at step (707). Specifically the simulcast signal includes at least a reference parameter, a first identification signal, and a second identification signal, the first identification signal and the second identification signal distinguished from the reference parameter by, respectively, a first and a second predetermined amount that corresponds, respectively, to a first transmitter and a second transmitter. At step (803) we determine whether the signal includes a message for a user and if so at step (805) process and provide that message to the user.

In either event Step (807) performs an FFT on the portion of the simulcast signal that includes the ID signals and reference parameter, preferably tones as earlier noted. The resulting amplitudes of the ID signals are buffered or stored at step (809). At optional step (811) the weighted rolling averages of the ID signals are updated. Step (813) performs a scanning and comparing procedure on the ID signals or weighted rolling averages and selects an appropriate indication. Step (813) includes steps (815, 817, 819, 821) and these are selectively performed depending on the particular embodiment.

Figure 8:
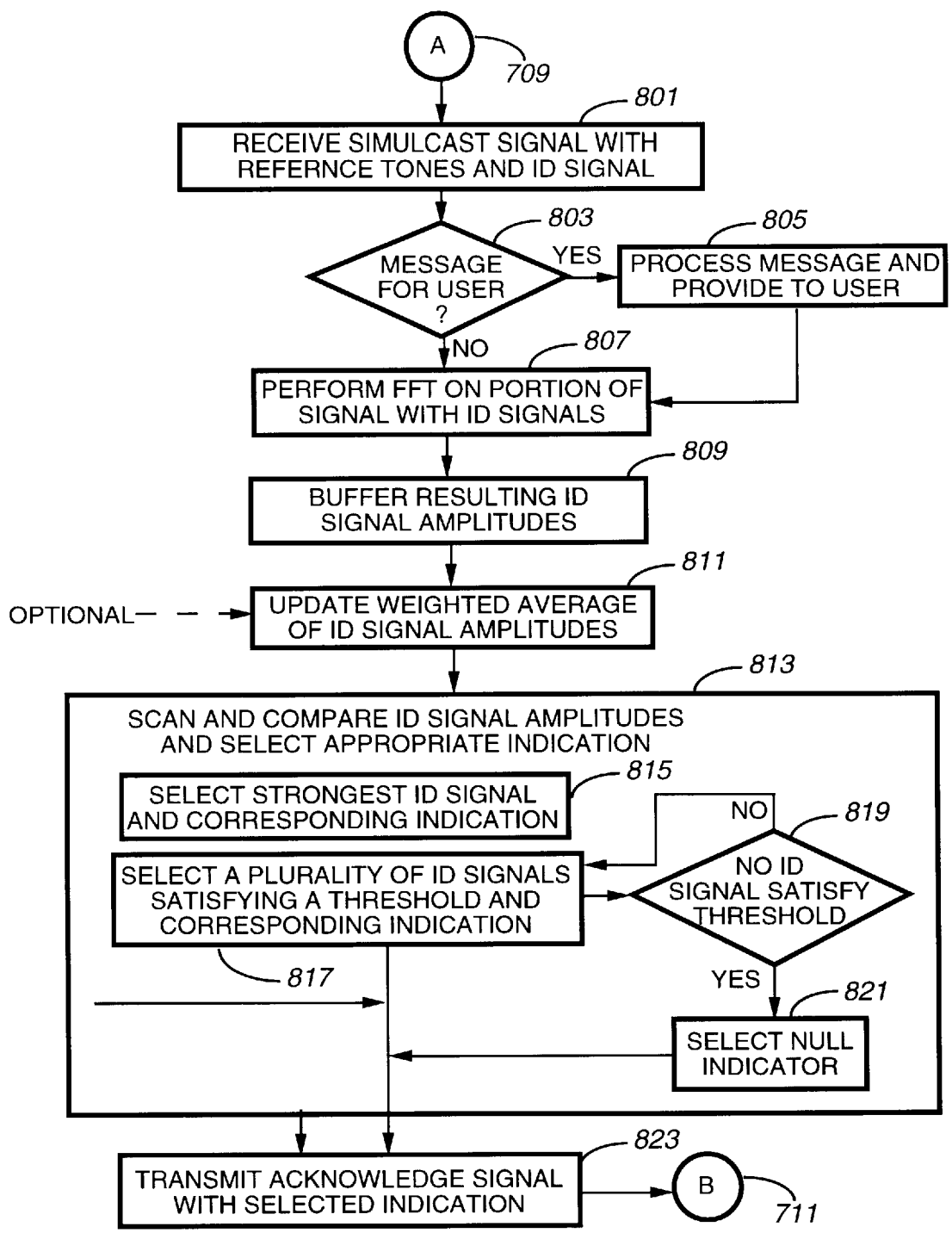
FIG. 8 depicts a flowchart of an alternative method embodiment from the perspective of the FIG. 4 messaging unit.

Step (815) selects the strongest ID signal and corresponding indication of the same by comparing all of the ID signals, including in particular a first identification signal to a second identification signal, to provide an indication corresponding to the desirable transmitter. Alternatively step (817) will select a plurality of ID signals each of which satisfies a threshold and a corresponding indication thereof. If no ID signal satisfies the threshold as determined at step (819), step (821) selects a null indication. In any event after step (813) step (823) transmits an acknowledgment signal or a volitionally generated signal that includes the selected indication and the process goes to B (711). Summarizing FIGS. 7 and 8 depict inventive approaches for usually determining a desirable transmitter for delivery of a message in a non-simulcast mode. Having selected such a transmitter and having then made such a transmission the MU will receive this transmission, in a non-simulcast mode, including a message from this transmitter that corresponds to the indication.

It will be appreciated by those of ordinary skill in the art that the apparatus and methods disclosed provide various approaches for determining a desirable transmitter for a directed message delivery in a messaging system that is set up for simulcast operation without unduly compromising any signal or system characteristics or otherwise un-necessarily burdening processing resources. These inventive structures and methods may be readily and advantageously employed in a wireless selective messaging system, system controller or messaging unit to provide directed message delivery and the resultant enhanced system capacity. Hence, the present invention, in furtherance of satisfying a long-felt need of wireless communications, readily facilitates, for example, systems, receivers, and the like that require simulcast operation for hailing or initial unit location and thereafter directed message delivery to accommodate the requisite level of system traffic. Such information may by advantageously used to provide greater system capacity by facilitating, for example, more accurate directed message delivery or allowing more freedom from a messaging system perspective to provide directed message delivery.

It will be apparent to those skilled in the art that the disclosed invention may be modified in numerous ways and may assume many embodiments other than the preferred forms specifically set out and described above. For example many of the inventive procedures and apparatus described in a preferred form for FSK systems will work equally well for QAM systems, for example. Accordingly, it is intended by the appended claims to cover all modifications of the invention which fall within the true spirit and scope of the invention.

What is claimed is:

1. In a messaging system including a plurality of transmitters arranged and constructed to operate in a simulcast mode, a method of selecting a transmitter for directed message delivery, the method including the steps of;

directing a first and a second transmitter to transmit in the simulcast mode, respectively, a first signal including a reference parameter and a first identification signal and a second signal including said reference parameter and a second identification signal, said first identification signal and said second identification signal distinguished from said reference parameter by, respectively, a first and a second predetermined amount, receiving an acknowledgment signal that includes a indication of said first identification signal relative to said second identification signal as determined at a messaging unit location, said indication corresponding to a preferred transmitter, selected from said first and said second transmitter, for a directed message delivery to said messaging unit.

2. The method of claim 1 further including a step of directing a transmission, in a non-simulcast mode, of a message from said preferred transmitter.

3. The method of claim 1 wherein said first signal is transmitted with modulation including a reference tone and a first transmitter identification tone and said second signal is transmitted with modulation including said reference tone and a second transmitter identification tone.

4. The method of claim 3 wherein said step of receiving an acknowledgment signal further includes receiving an indication corresponding to a strongest identification tone as determined by a comparison of said first and said second transmitter identification tone at said messaging unit.

5. The method of claim 3 wherein said step of receiving an acknowledgment signal further includes receiving an indication corresponding to a plurality of acceptable identification tones as determined by a comparison of said first and said second transmitter identification tone to a predetermined threshold at said messaging unit.

6. The method of claim 3 wherein said step of receiving an acknowledgment signal further includes receiving an indication corresponding to no acceptable identification tones as determined by a comparison of said first and said second transmitter identification tone to a predetermined threshold at said messaging unit.

7. The method of claim 6 further including a step of directing a transmission, in a simulcast mode, of a message from said first and said second transmitter.

8. A method of determining a desirable transmitter for a message delivery to a messaging unit, the method including the steps of;
receiving a simulcast signal including a reference parameter, a first identification signal, and a second identification signal, said first identification signal and said second identification signal distinguished from said reference parameter by, respectively, a first and a second predetermined amount that corresponds, respectively, to a first transmitter and a second transmitter,
comparing said first identification signal to said second identification signal to provide an indication corresponding to the desirable transmitter,
transmitting a signal including said indication.

9. The method of claim 8 further including a step of receiving a transmission, in a non-simulcast mode, of a message from a transmitter corresponding to said indication.

10. The method of claim 8 wherein said step of receiving a simulcast signal includes receiving a reference tone, a first transmitter identification tone and a second transmitter identification tone.

11. The method of claim 10 wherein said step of transmitting said signal further includes transmitting an indication corresponding to a strongest identification tone as determined by a comparison of said first and said second transmitter identification tone.

12. The method of claim 10 wherein said step of transmitting said signal further includes transmitting an indication corresponding to a plurality of acceptable identification tones as determined by a comparison of said first and said second transmitter identification tone to a predetermined threshold.

13. The method of claim 10 wherein said step of transmitting said signal further includes transmitting an indication corresponding to no acceptable identification tones as determined by a comparison of said first and said second transmitter identification tone to a predetermined threshold.

14. The method of claim 13 further including a step of receiving a transmission, in a simulcast mode, of a message from said first and said second transmitter.

15. A messaging system including a plurality of transmitters arranged and constructed to operate in a simulcast mode or non-simulcast mode, the system comprising in combination;

a first transmitter for transmitting in a simulcast mode a first signal including a reference parameter and a first identification signal spectrally spaced from said reference parameter by a first predetermined amount,
a second transmitter for transmitting in a simulcast mode a second signal including said reference parameter and a second identification signal distinguished from said reference parameter by a second predetermined amount,
a base receiver for receiving an acknowledgment signal that includes an indication corresponding to a comparison of said first identification signal and said second identification signal as determined at a messaging unit location, said indication corresponding to a preferred transmitter, selected from said first and said second transmitter, for a directed message delivery to said messaging unit.

16. The messaging system of claim 15 further including a system controller, coupled to said first transmitter, said second transmitter, and said base receiver, for directing a transmission, in a non-simulcast mode, of a message from said preferred transmitter.

17. The messaging system of claim 15 wherein said first transmitter transmits said first signal with modulation including a reference tone and a first transmitter identification tone and said second transmitter transmits said second signal with modulation including said reference tone and a second transmitter identification tone.

18. The messaging system of claim 17 wherein said base receiver receives said acknowledgment signal further including a indication corresponding to a strongest identification tone as determined by a comparison of said first and said second transmitter identification tone at said messaging unit.

19. The messaging system of claim 17 wherein said base receiver receives said acknowledgment signal further including a indication corresponding to a plurality of acceptable identification tones as determined by a comparison of said first and said second transmitter identification tone to a predetermined threshold at said messaging unit.

20. The messaging system of claim 17 wherein said base receiver receives said acknowledgment signal further including a indication corresponding to no acceptable identification tones as determined by a comparison of said first and said second transmitter identification tone to a predetermined threshold at said messaging unit.

21. The messaging system of claim 20 further including a system controller, coupled to said first transmitter, said second transmitter, and said base receiver, for directing a transmission, in a simulcast mode, of a message from said first and said second transmitter.

22. A messaging unit arranged and constructed to determine a desirable transmitter for a message delivery, the selective messaging unit comprising in combination;
a receiver for receiving a simulcast signal including a reference parameter, a first identification signal, and a second identification signal, said first identification signal and said second identification signal distinguished from said reference parameter by, respectively, a first and a second predetermined amount that corresponds, respectively, to a first transmitter and a second transmitter,
a comparator, coupled to said receiver, for comparing said first identification signal and said second identification signal to provide an indication signal,
a transmitter, coupled to said comparator, for transmitting a signal including a transmitter identification corresponding to said indication signal.

23. The messaging unit of claim 22 wherein said receiver further receives a transmission, in a non-simulcast mode, of a message from a transmitter corresponding to said transmitter identification.

24. The messaging unit of claim 22 wherein said receiver receives a simulcast signal including a reference tone, a first transmitter identification tone and a second transmitter identification tone.

25. The messaging unit of claim 24 wherein said transmitter transmits a signal further including a transmitter identification corresponding to a strongest identification tone as determined by a comparison of said first to said second transmitter identification tone.

26. The messaging unit of claim 24 wherein said transmitter transmits a signal further including a transmitter identification corresponding to a plurality of acceptable identification tones as determined by a comparison of said first and said second transmitter identification tone to a predetermined threshold.

27. The messaging unit of claim 24 wherein said transmitter transmits a signal further including a transmitter identification corresponding to no acceptable identification tones as determined by a comparison of said first and said second transmitter identification tone to a predetermined threshold.

28. The messaging unit of claim 27 wherein said receiver further receives a transmission, in a simulcast mode, of a message from said first and said second transmitter.

* * * * *